US012770092B2

(12) United States Patent
Sheth et al.

(10) Patent No.: US 12,770,092 B2
(45) Date of Patent: Oct. 20, 2026

(54) CONTACTLESS ITEM DELIVERY CONFIRMATION

(71) Applicant: ZEBRA TECHNOLOGIES CORPORATION, Lincolnshire, IL (US)

(72) Inventors: Maulin Sheth, Central Islip, NY (US); Krunal Soni, Holbrook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 45 days.

(21) Appl. No.: 17/115,450

(22) Filed: Dec. 8, 2020

(65) Prior Publication Data

US 2022/0180308 A1 Jun. 9, 2022

(51) Int. Cl.

| | |
|---|---|
| ***G06Q 10/0833*** | (2023.01) |
| ***G06F 3/04883*** | (2022.01) |
| ***G06K 7/10*** | (2006.01) |
| ***G06K 19/06*** | (2006.01) |

(52) U.S. Cl.

CPC ..... *G06Q 10/0833* (2013.01); *G06F 3/04883* (2013.01); *G06K 7/10544* (2013.01); *G06K 19/06009* (2013.01)

(58) Field of Classification Search

CPC ............ G06Q 10/0833; G06F 3/04883; G06K 7/10544; G06K 19/06009

See application file for complete search history.

(56) References Cited

U.S. PATENT DOCUMENTS

| | | | | |
|---|---|---|---|---|
| 6,292,595 | B1 | 9/2001 | Petteruti et al. | |
| 2010/0324710 | A1 | 12/2010 | DeLaCruz | |
| 2016/0065819 | A1 | 3/2016 | Kannan et al. | |
| 2018/0232693 | A1* | 8/2018 | Gillen | G06Q 10/0834 |
| 2021/0056494 | A1* | 2/2021 | Denn Yangourazov | G07F 11/16 |
| 2021/0150474 | A1* | 5/2021 | Park | G06Q 10/0833 |
| 2021/0256464 | A1* | 8/2021 | Kasanen | G06Q 50/28 |

OTHER PUBLICATIONS

Yung-Wei Kao, Physical Access Control Based on QR Code, 2011, p. 285-286 (Year: 2011).*

"Scandit Contactless Proof of Delivery Web App Helps with Social Distancing for Customers and Delivery Drivers" Retrieved from web on Nov. 24, 2020. [https://www.scandit.com/industries/post-and-parcel/contactless-proof-of-delivery-web-app/].

(Continued)

*Primary Examiner* — Ibrahim N El-Bathy

(57) ABSTRACT

A method includes: capturing an item identifier associated with an item for delivery to a recipient; generating a machine-readable indicium encoding (i) a network identifier of a server, and (ii) the item identifier; controlling an output device to present the machine-readable indicium for capture by a recipient computing device and transmission of delivery confirmation data from the recipient computing device to the server using the network identifier and the item identifier; and receiving an indication that the delivery confirmation data was received at the server from the recipient computing device.

18 Claims, 6 Drawing Sheets

(56) References Cited

OTHER PUBLICATIONS

SangKong et al. “Smart VolP Postbox with Confirmation Receipt using IoT Technology”, ICIDE 2017: Proceedings of the 2017 International Conference Receipt on Industrial Design Engineering, Dec. 2017. Retrieved on Sep. 1, 2022, from <URL:https://dl.acm.org/doi/pdf/10.1145/3178264.3178283> entire document.

International Search Report and Written Opinion for International Application No. PCT/US2021/059811 mailed on Feb. 1, 2022.

* cited by examiner

CONTACTLESS ITEM DELIVERY CONFIRMATION

BACKGROUND

Delivery of items to recipients (e.g. residents or businesses) may be performed by delivery staff, e.g. employees of a courier, postal service or the like. Delivery personnel may collect information confirming that an item was successfully delivered to a recipient, or that the recipient refused delivery. Such information may include, for example, a signature of the recipient, which can be collected via physical interaction of the recipient with a computing device carried by the delivery personnel. Such physical interaction may expose either or both of the recipient and the delivery personnel to hazards such as infectious disease, however.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
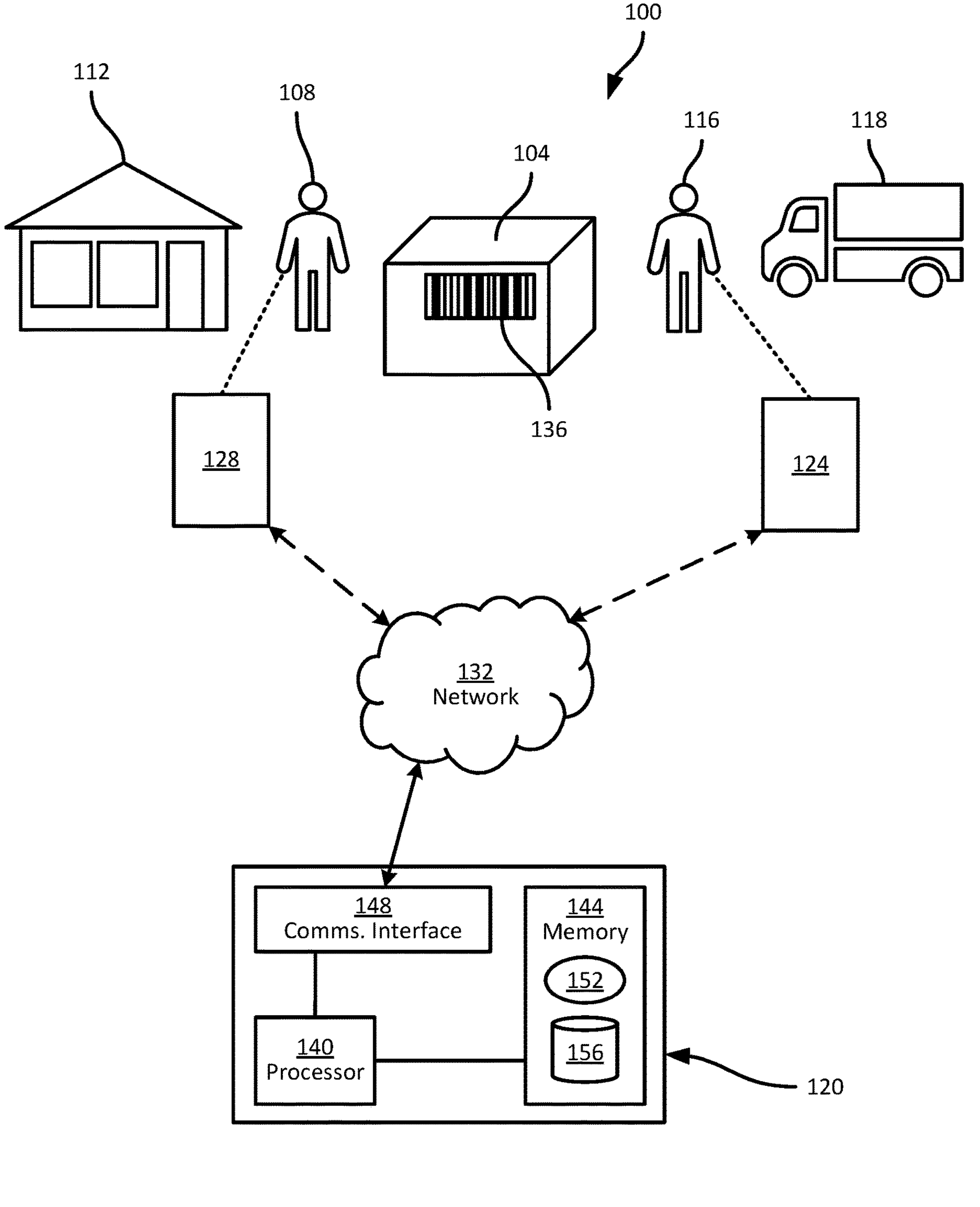
FIG. 1 is a diagram of a system for contactless delivery confirmation.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method comprising: capturing an item identifier associated with an item for delivery to a recipient; generating a machine-readable indicium encoding (i) a network identifier of a server, and (ii) the item identifier; controlling an output device to present the machine-readable indicium for capture by a recipient computing device and transmission of delivery confirmation data from the recipient computing device to the server using the network identifier and the item identifier; and receiving an indication that the delivery confirmation data was received at the server from the recipient computing device.

Additional examples disclosed herein are directed to a delivery computing device, comprising: an output device; a communications interface; and a processor configured to: capture an item identifier associated with an item for delivery to a recipient; generate a machine-readable indicium encoding (i) a network identifier of a server, and (ii) the captured item identifier; control the output device to present the machine-readable indicium for capture by a recipient computing device and transmission of delivery confirmation data from the recipient computing device to the server using the network identifier and the item identifier; and receive from the server, via the communications interface, an indication that the delivery confirmation data was received at the server from the recipient computing device.

Further examples disclosed herein are directed to a method at a server, the method comprising: receiving, from a recipient computing device, a delivery confirmation request containing a network identifier of the server and an item identifier associated with an item for delivery to a recipient, the request received responsive to the recipient computing device capturing a machine-readable indicium encoding the network identifier and the item identifier; in response to the delivery confirmation request, sending a contactless delivery confirmation page containing an input element to the recipient computing device; receiving from the recipient computing device, via the input element of the contactless delivery confirmation page, delivery confirmation data; and returning the delivery confirmation data to a delivery computing device associated with the item, for display at the delivery computing device.

FIG. 1 illustrates a system 100 for contactless item delivery confirmation. An item 104, such as a package containing merchandise or other materials purchased by a recipient 108, may be delivered to a residence 112 or other suitable location associated with the recipient 108 by delivery personnel 116. The delivery personnel 116 may, for example, operate a vehicle 118 to deliver the item 104 and/or other items, and is therefore also referred to herein as the driver 116.

A delivery status of the item 104 (and other items handled by the driver 116) is maintained, for example at a server 120. The driver 116 operates a computing device 124, also referred to herein as the delivery device or driver device 124, which may be a smart phone, a wearable computer, a tablet computer, or the like. The driver device 124 is configured to report various stages of the delivery process for the item 104 to the server 120 for storage and reporting purposes. In particular, physical transfer of the item 104 to the recipient 108, which completes delivery of the item 104, may be documented at the server 120 by collecting confirmation data from the recipient 108, such as a signature of the recipient 108.

In some systems, collecting confirmation data from the recipient 108 is achieved by presentation of a signature field, e.g. on a touch screen of the driver device 124. The recipient 108 may then physically interact with the driver device 124 to enter a signature (e.g. by touch gestures) in the signature field. The driver device 124 may then be returned to the driver 116, and the collected signature may be transmitted to the server 120 for storage along with an indication that delivery of the item 104 is complete.

The above mechanism for confirming delivery of the item 104, however, may expose the driver 116 and/or the recipient 108 to infectious disease by way of shared handling of the driver device 124. The components of the system 100 therefore implement functionality to enable contactless collection of confirmation data, such as the above-mentioned recipient signature, and conveyance of such confirmation data to the driver device 124 and the server 120.

In particular, the system 100 also includes a computing device 128 operated by the recipient 108 and therefore also referred to as the recipient device 128. The recipient device 128 can be a smartphone, a tablet computer, or the like. Each of the server 120, the driver device 124, and the recipient device 128 are connected via a network 132, which can be any suitable combination of local and wide-area networks, including the Internet.

As will be described in greater detail below, upon arrival of the driver 116 at the residence 112, the driver device 124 is operated to obtain an identifier of the item 104, e.g. by capturing and decoding an item indicium 136 associated with (e.g. affixed to) the item 104. The item identifier may be a suitable alphanumeric string identifying the item 104 distinctly from any other items under the care of the courier entity, postal service or the like associated with the driver 116 and server 120. The item identifier, along with an identifier of the server 120, is then encoded for presentation by the driver device 124, in a machine-readable indicium that can be captured by the recipient device 128.

The recipient device 128 can then be operated by the recipient 108 to capture and decode the above-mentioned indicium. Using the identifier of the server 120 from the indicium, the recipient device 128 can request a confirmation page from the server 120, which provides an input element for the recipient to enter a signature, e.g. via a touch screen of the recipient device 128. In other words, the server 120 collects the confirmation data from the recipient device 128, rather than the driver device 124 collecting the confirmation data directly from the recipient 108. The confirmation data may also be returned from the server 120 to the driver device 124, e.g. to provide confirmation to the driver 116 that the confirmation process is complete.

The system 100 therefore enables the documentation of the delivery process without requiring physical contact between the recipient 108 and the driver device 124. In addition, as will be detailed below, the contactless process defined herein enables collection of delivery confirmation data without the installation of specialized software on the recipient device 128, and with limited activity on the part of the recipient 108. For instance, the recipient 108 need not scan the item 104 itself with the recipient device 128. Further, the contactless confirmation process can be completed with a single scan operation by the recipient device 128 (to capture the above-mentioned machine-readable indicium).

Before discussing the contactless confirmation process in detail, certain internal components of the server 120, as well as the driver device 124 and the recipient device 128, will be described. As shown in FIG. 1, the server 120 includes a controller, such as a processor 140 (e.g. a central processing unit, CPU), interconnected with a non-transitory computer readable storage medium, such as a memory 144. The memory 144 includes a combination of volatile memory (e.g. Random Access Memory or RAM) and non-volatile memory (e.g. read only memory or ROM, Electrically Erasable Programmable Read Only Memory or EEPROM, flash memory). The processor 140 and the memory 144 each comprise one or more integrated circuits. The server 120 also includes a communications interface 148 enabling the server 120 to exchange data with other computing devices, including the driver device 124 and the recipient device 128, via the network 132. The communications interface 148 thus includes any suitable combination of hardware, firmware and/or software to enable the server 120 to communicate over the network 132.

The memory 144 of the server 120 stores computer readable instructions for execution by the processor 140. In particular, the memory 144 stores a delivery monitoring application 152, executable by the processor 140 to exchange delivery status data with the driver device 124, and to communicate with the recipient device 128 to enable contactless delivery confirmation. The memory 144 also stores a repository 156, e.g. containing identifiers and delivery status information for each item under the care of the courier, postal service or the like operating the server 120 (including the item 104 in this instance). Such information may include, for example, an identifier of the driver 116 and/or driver device 124 assigned to deliver a given item. Such information may also include names, addresses and/or other contact information of recipients (e.g. e-mail addresses, phone numbers and the like), and timestamps corresponding to the completion of various stages of item delivery (e.g. arrival at a sorting facility, placement onto the vehicle 118 for delivery, confirmation of delivery to the recipient 108, and the like).

Figure 2:
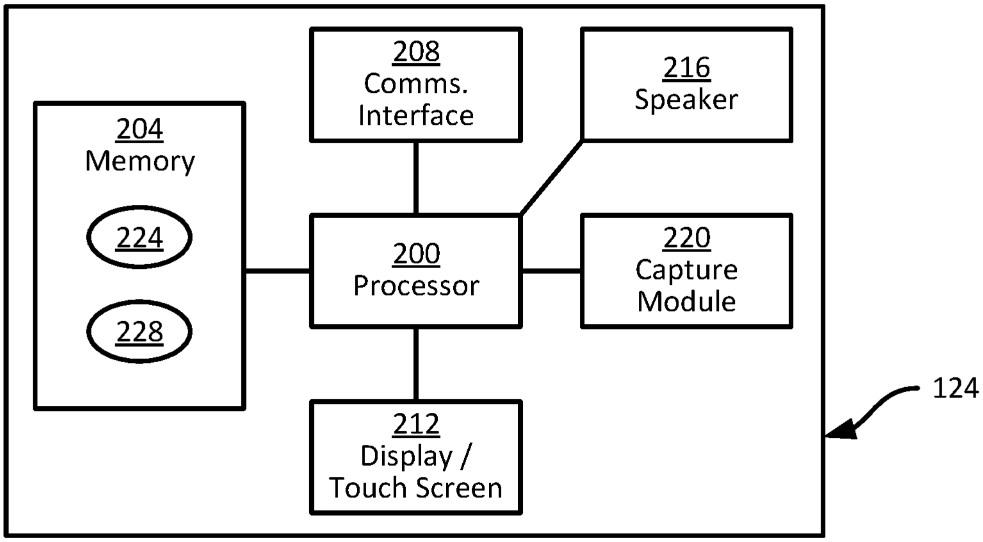
FIG. 2 is a diagram of certain internal components of the delivery and recipient computing devices of FIG. 1.
Figure 2:
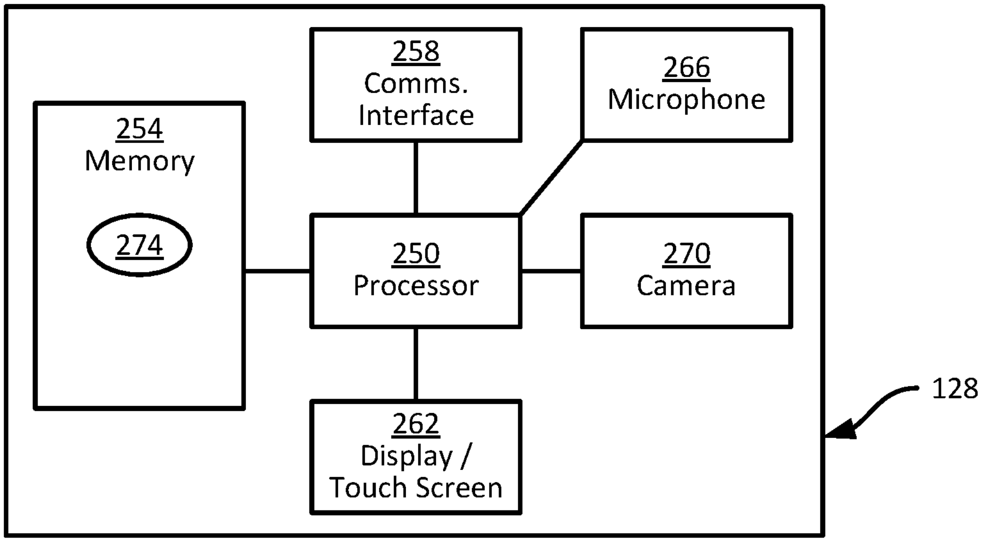

Turning now to FIG. 2, certain internal components of each of the devices 124 and 128 are shown. The driver device 124 includes a controller, such as a processor 200 (e.g. a CPU), interconnected with a non-transitory computer readable storage medium, such as a memory 204. The memory 204 includes a combination of volatile memory (e.g. RAM) and non-volatile memory (e.g. ROM, EEPROM, flash memory). The processor 200 and the memory 204 each comprise one or more integrated circuits. The driver device 124 also includes a communications interface 208 enabling the driver device 124 to exchange data with other computing devices, including the server 120, via the network 132. The communications interface 208 thus includes any suitable combination of hardware, firmware and/or software to enable the driver device 124 to communicate over the network 132. For example the communications interface 208 may implement one or more wireless transceivers, e.g. enabling communication over cellular networks, local wireless networks, and the like.

The driver device 124 also includes an output device, controllable by the processor 200 to present various data in a manner that is perceptible by other computing devices (e.g. the recipient device 128) and/or nearby persons such as the driver 116 and the recipient 108. In the present example, the output device includes a display 212, which is integrated with an input device in the form of a touch screen. In other examples, other input devices (e.g. keypads, microphones, and the like) can be provided instead of, or in addition to, the touch screen. The driver device 124 also includes, in the illustrated example, a further output device in the form of a speaker 216.

The driver device 124 also includes a data capture module 220, such as a barcode scanner (e.g. laser-based, image sensor-based, or a combination thereof) enabling the driver device 124 to capture and decode the item indicium 136 shown in FIG. 1.

The memory 204 stores computer readable instructions executable by the processor 200 to perform various actions related to contactless collection of delivery confirmation data in the system 100. In particular, in this example the memory 204 stores a delivery tracking application 224, and a contactless data collection application 228. In general, execution of the application 224 enables the driver device 124 to generate status data for item deliveries, e.g. for passage to the server 120. For example, the application 224 can be configured to collect data such as item identifiers from the capture module 220, and store such item identifiers along with timestamps and indications of delivery stages, e.g. for transmission to the server 120.

The application 228, in turn, is configured to generate the above-mentioned machine-readable indicium for capture by the recipient device 128 when contactless delivery confirmation is desired, and to interact with the server 120 to receive confirmation data, as well as to pass such confirmation data to the application 224. In other words, the application 228 provides auxiliary functionality to the application 224, which may be the primary application employed by the driver device 124 to track delivery activities by the driver 116. The application 224 may call the application 228 under certain conditions to initiate contactless confirmation data collection. The example implementation illustrated in FIG. 2 enables the deployment of contactless delivery functionality with relatively minor changes to the application 224. In other examples, the functionality provided by the applications 224 and 228 may be combined in a single application.

The recipient device 128 includes a controller, such as a processor 250 (e.g. a CPU), interconnected with a non-transitory computer readable storage medium, such as a memory 254. The memory 254 includes a combination of volatile memory (e.g. RAM) and non-volatile memory (e.g. ROM, EEPROM, flash memory). The processor 250 and the memory 254 each comprise one or more integrated circuits. The recipient device 128 also includes a communications interface 258 enabling the recipient device 128 to exchange data with other computing devices, including the server 120, via the network 132. The communications interface 258 thus includes any suitable combination of hardware, firmware and/or software to enable the recipient device 128 to communicate over the network 132. For example the communications interface 258 may implement one or more wireless transceivers, e.g. enabling communication over cellular networks, local wireless networks, and the like.

The recipient device 128 also includes an output device, controllable by the processor 200 to present various data in a manner that is perceptible to nearby persons such as the recipient 108 and the driver 116, and/or to nearby computing devices. In the present example, the output device includes a display 262, which is integrated with an input device in the form of a touch screen. In other examples, other input devices (e.g. keypads, touch pads, and the like) can be provided instead of, or in addition to, the touch screen. The recipient device 128 also includes, in the illustrated example, a further input device in the form of a microphone 266, e.g. which may capture audio data played by the driver device 124 via the speaker 216.

The recipient device 128 also includes a camera 270, enabling the recipient device 128 to capture images of other objects. As will be apparent to those skilled in the art, the processor 250 and/or the camera 270 may include functionality enabling machine-readable indicia to be detected and decoded automatically in such images. This capability is exploited in the contactless delivery confirmation process described herein.

The memory 254 stores computer readable instructions executable by the processor 250 to perform various actions related to contactless collection of delivery confirmation data in the system 100. In particular, in this example the memory 254 stores a web browser application 274, executable by the processor 250 to retrieve web pages via the network 132, for presentation via the display 262.

Those skilled in the art will appreciate that the functionality implemented by the processor 200 and 250 via the execution of the applications 224, 228, and 274 respectively, may also be implemented by one or more specially designed hardware and firmware components, such as FPGAs, ASICs and the like in other embodiments.

Figure 3:
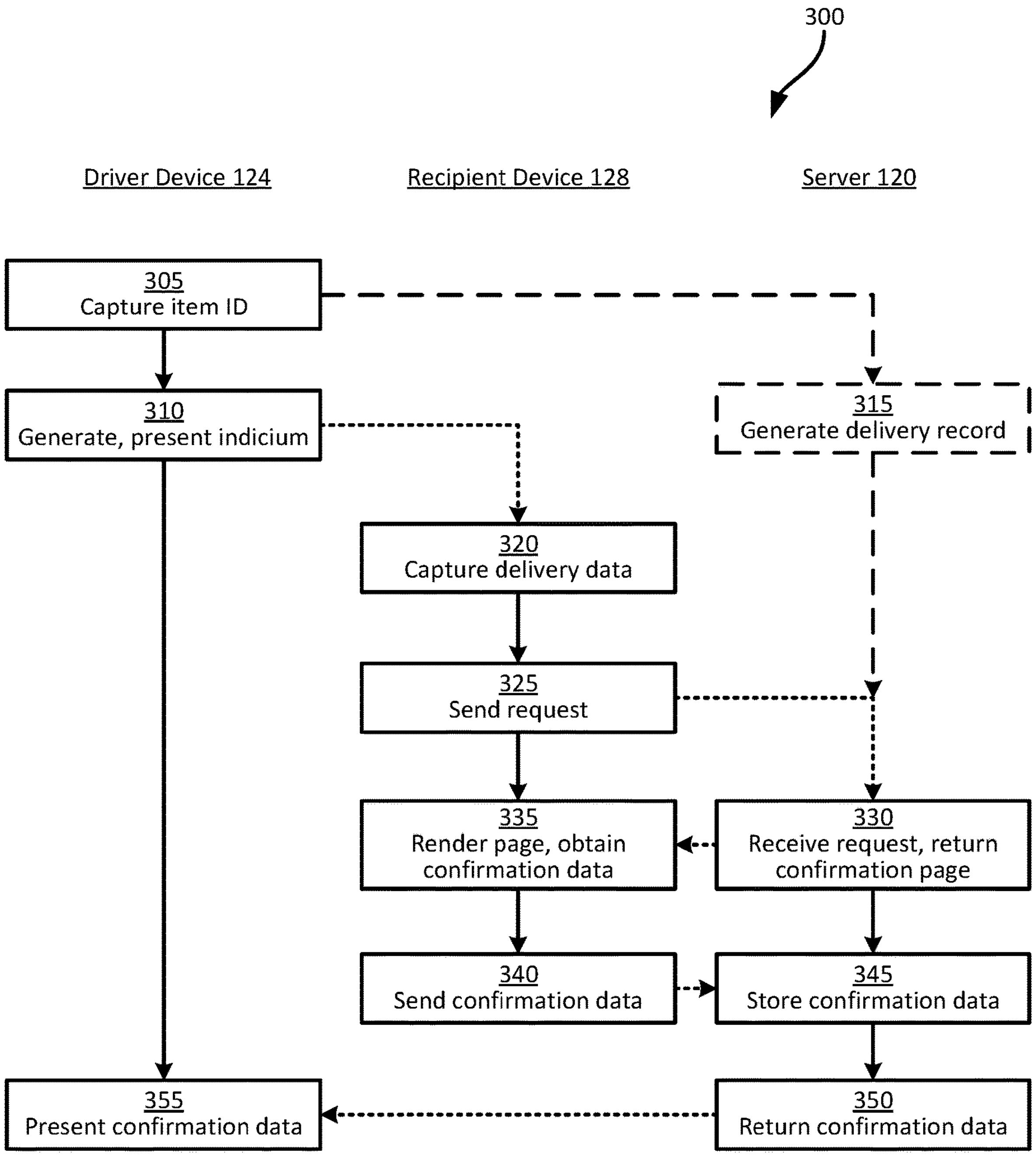
FIG. 3 is a flowchart of a method of contactless delivery confirmation.

Turning to FIG. 3, a method 300 of contactless item delivery confirmation is illustrated. The method 300 will be described below in conjunction with its example performance in the system 100. As indicated in FIG. 3, certain blocks of the method 300 are performed by the driver device 124, while other blocks of the method 300 are performed by the recipient device 128, and still other blocks of the method 300 are performed by the server 120.

Figure 4:
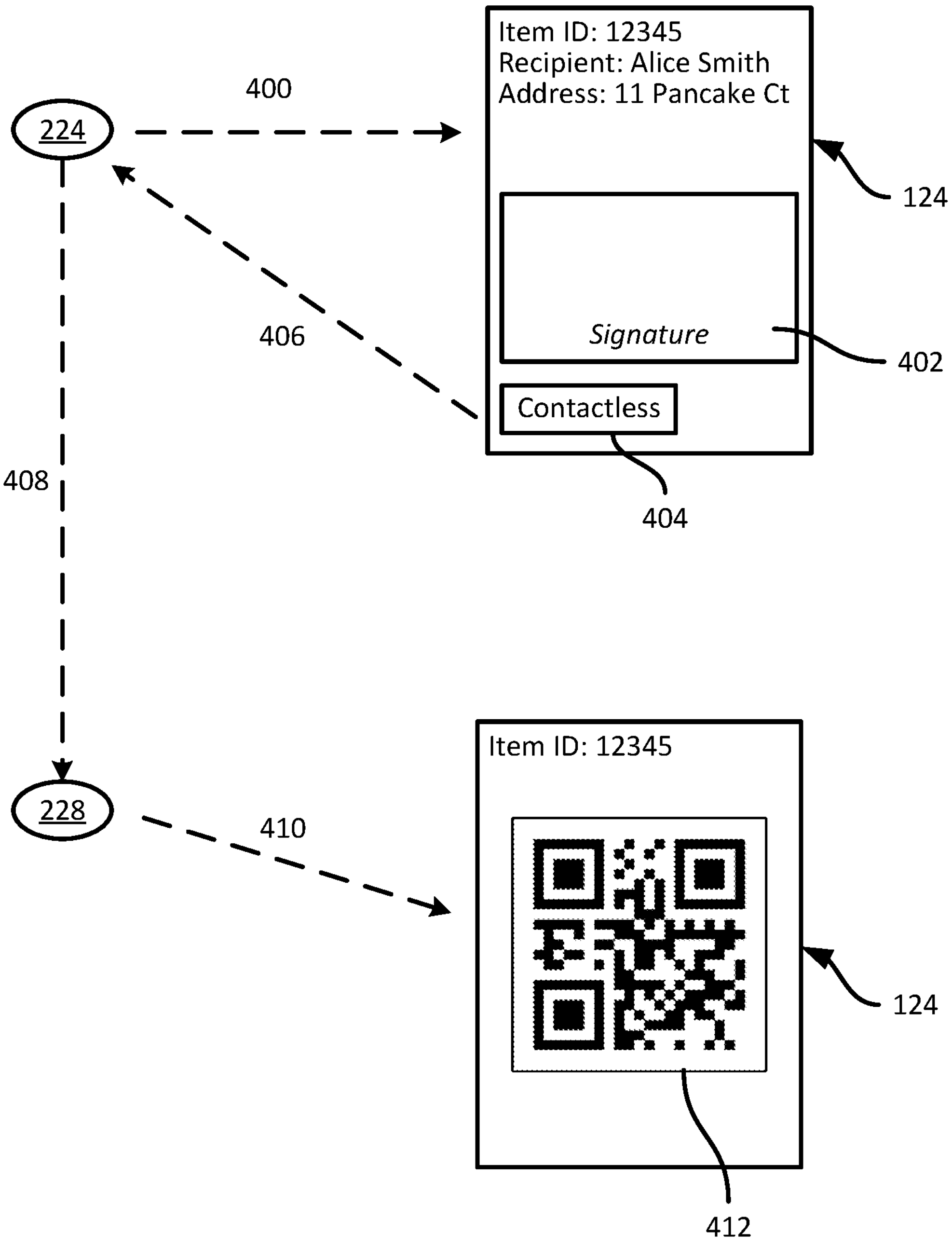
FIG. 4 is a diagram illustrating an example performance of blocks 305 and 310 of the method of FIG. 3.

At block 305, e.g. once the driver 116 has arrived at the residence 112 to deliver the item 104, the driver device 124 is configured to obtain an item identifier of the item 104. For example, the capture module 220 can be controlled by the processor 200 to capture and decode the indicium 136 to obtain the item identifier. Capturing the item identifier can be performed via execution of the application 224 by the driver device 124. For example, turning to FIG. 4, the device 124 is shown with the display 212 visible following capture of the item identifier "12345". The application 224 can control the display 212, in a first operation 400, to generate an interface for the collection of delivery confirmation data. For example, as illustrated the interface presents the item identifier, as well as a name and address of the recipient 108. The interface also includes an input element 402, such as a signature field, for the recipient 108 to enter a signature confirming receipt of the item 104.

In some examples, the recipient 108 can provide a signature by physically handling the driver device 124. As noted earlier, however, physical contact between the recipient 108 and the driver device 124 may be undesirable. Therefore, the interface presented by the driver device 124 also includes a selectable element 404 such as a button, selection of which initiates additional functionality to obtain confirmation data without physical contact between the recipient 108 and the driver device 124. When the element 404 is selected, e.g. by the driver 116, as indicated by a second operation 406, the application 224 is configured to call the application 228, via a third operation 408.

Returning briefly to FIG. 3, at block 310 when the application 228 is invoked, the driver device 124 is configured to generate and present a machine-readable indicium containing at least the item identifier and a network identifier of the server 120. Returning to FIG. 4, via fourth operation 410, the application 228 can take control of the display 212 from the application 224, and replace the interface mentioned above with a contactless data collection interface including a machine-readable indicium 412.

In other examples, the presentation of the first interface by the application 224, as well as selection of the element 404, can be omitted, and the device 124 can instead proceed automatically to generation of the machine-readable indicium 412 in response to capturing the item identifier.

The machine-readable indicium 412 is a QR code in the present example. In other examples, however, the machine-readable indicium 412 can be another suitable 1-dimensional or 2-dimensional barcode format, or other graphical indicia detectable by the camera 270 of the recipient device 108. In further examples, the machine-readable indicium 412 can be audio data, which can be presented by playing via the speaker 216, and subsequently captured by the microphone 266 of the recipient device 128.

The network identifier encoded in the machine-readable indicium 412 can be an internet protocol (IP) address of the server 120, a uniform resource locator (URL) corresponding to the server 120, or the like. In general, the network identifier enables the recipient device 128 to address data transmissions to the server 120. The machine-readable indicium 412 can also encode, in addition to the network identifier and the item identifier, a delivery identifier that uniquely identifies the combination of the item 104 and this particular attempt to deliver the item 104. The delivery identifier can include, for example, the item identifier, a timestamp indicating the current date and time, and an identifier of the driver device 124 itself (e.g. a model number and/or serial number of the driver device 124).

As shown in FIG. 3, at block 305 the driver device 124 may also, optionally, send a message to the server 120 indicating that an attempt to deliver the item 104 has been initiated. The message, received at the server 120 at block 315, can include the same information as noted above in connection with the machine-readable indicium 412. In response to receiving such a message, at block 315 the server 120 can generate a delivery record in the repository 156. The record corresponds to the item 104, and may configure the server 120 to await further transmissions from the recipient device 128. In other examples, however, the transmission and therefore the performance of block 315 may be omitted.

Following generation and presentation of the machine-readable indicium 412 at block 310, at block 320 the recipient device 128 is configured to capture the delivery data encoded in the machine-readable indicium 412. That is, the recipient device 128 is configured to capture at least the network identifier of the server 120, and the item identifier. In the present example, the recipient device 128 is also configured to capture the above-mentioned combination of the identifier(s) of the driver device 124 and timestamp.

For example, the camera 270 of the recipient device 128 may be controlled to capture an image of the display 212 of the driver device 124 at block 310. The recipient device 128 may then detect and decode the machine-readable indicium 412 from the image. At block 325, the recipient device 128 is then configured to send a delivery confirmation request to the server 120, using the network identifier recovered from the machine-readable indicium 412. The request sent at block 325 also includes at least the item identifier. Further, in this example the request includes the delivery identifier (e.g. the identifier(s) of the driver device 124 and the timestamp from the machine-readable indicium 412).

Figure 5:
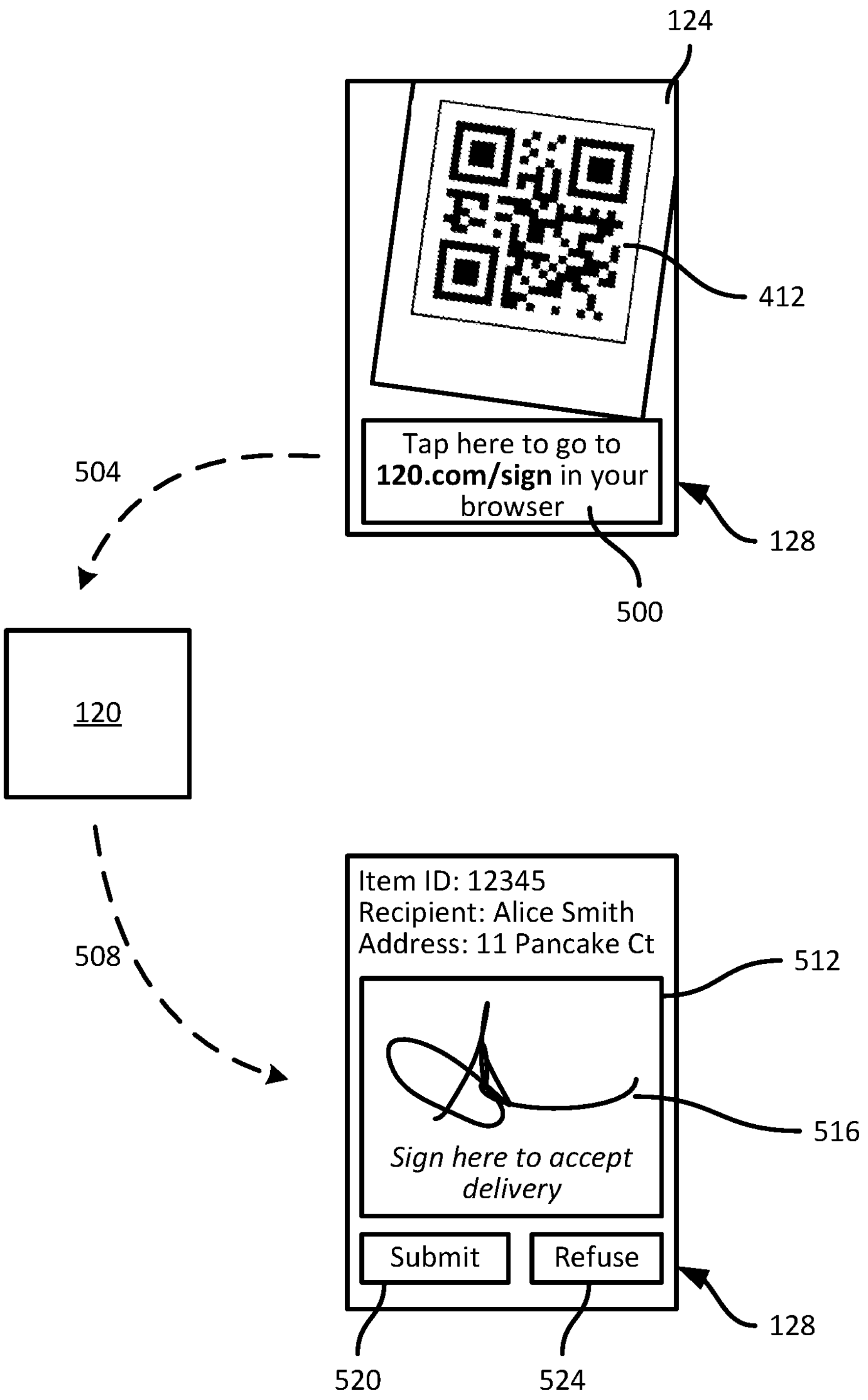
FIG. 5 is a diagram illustrating an example performance of blocks 320 and 325 of the method of FIG. 3.

Turning to FIG. 5, an example performance of blocks 320 and 325 at the recipient device 128 is illustrated. In particular, the recipient device 128 is shown with a camera feed presented on the display 262, including a portion of the driver device 124 itself, which is currently displaying the machine-readable indicium 412. The recipient device 128 can process images captured via the camera feed to detect machine-readable indicia, and when they are detected, to decode them. It will therefore be understood that "capturing" an image, in this context, need not include storing an image persistently in the memory 254. Further, it will be apparent from the above that no contact between the recipient 108 and the driver device 124 is necessary, nor is the recipient device 128 required to scan the indicium 136 on the item 104.

Upon detecting and decoding the machine-readable indicium 412, the recipient device 128 may present a prompt 500 on the display 262 indicating the network identifier of the server 120 (e.g. "120.com/sign") and instructing the recipient 108 to select the prompt 500 to open the identified URL in the browser application 274. The recipient device 128 proceeds to block 325 when the prompt 500 is selected.

At block 325, the recipient device 128 transmits a request 504. The request 504 can be, for example, an HTTP request to the URL shown in FIG. 5, and including the item identifier as well as any additional information from the machine-readable indicium 412 (e.g. the identifier(s) of the device 124 and the timestamp) either appended to the URL or as parameters associated with the request.

Referring again to FIG. 3, at block 330 the server 120 is configured to receive the request 504, and in response return a confirmation data collection web page to the recipient device 128. At block 335, the recipient device 128 is configured to receive and render, e.g. on the display 262, the confirmation data collection web page. The recipient device 128 is further configured to obtain confirmation data at block 335, such as the above-mentioned signature. For example, the web page can include an input field for receipt of a signature from the recipient 108.

Turning to FIG. 5, a web page 508 is shown being transmitted from the server 120 to the recipient device 128 in response to the request 504. The web page 508 is rendered at the recipient device 128, and includes an input field 512, into which the recipient 108 may enter a signature 516. The web page 508 may also include a selectable submission element 520 to return the confirmation data to the server 120. In some examples, the web page 508 may further include a selectable refusal element 524, enabling the recipient device 128 to indicate to the server 120 that delivery of the item 104 is being refused (e.g. because the item 104 is damaged, addressed to another recipient, or the like). Confirmation data can therefore include data indicating acceptance of delivery, such as the signature 516, or data indicating refusal of delivery.

At block 340, the recipient device 128 is configured to send the above-mentioned confirmation data to the server 120, which receives and stores the confirmation data at block 345. For example, when block 315 is included in the method 300, the server can retrieve the previously created delivery record and update the record to include the confirmation data received from the recipient device 128. In other examples, where block 315 is omitted, the server 120 can create a delivery record at block 345, and store therein the item identifier, the identifier(s) of the delivery device 124, the timestamp, and the confirmation data. The delivery record can further be updated to mark the delivery as complete, and the server 120 may therefore refuse any further attempts to submit confirmation data (e.g. a signature) for the item 104. That is, a further attempt by the recipient device 128 to request the confirmation page and submit confirmation data may result in an error message being returned from the server 120 to the recipient device 128.

As will now be apparent, confirmation data is provided to the server 120 without any physical contact between the recipient 108 and the driver device 124, or between the driver 116 and the recipient device 128. Instead, the recipient 108 need only physically contact the recipient device 128.

Figure 6:
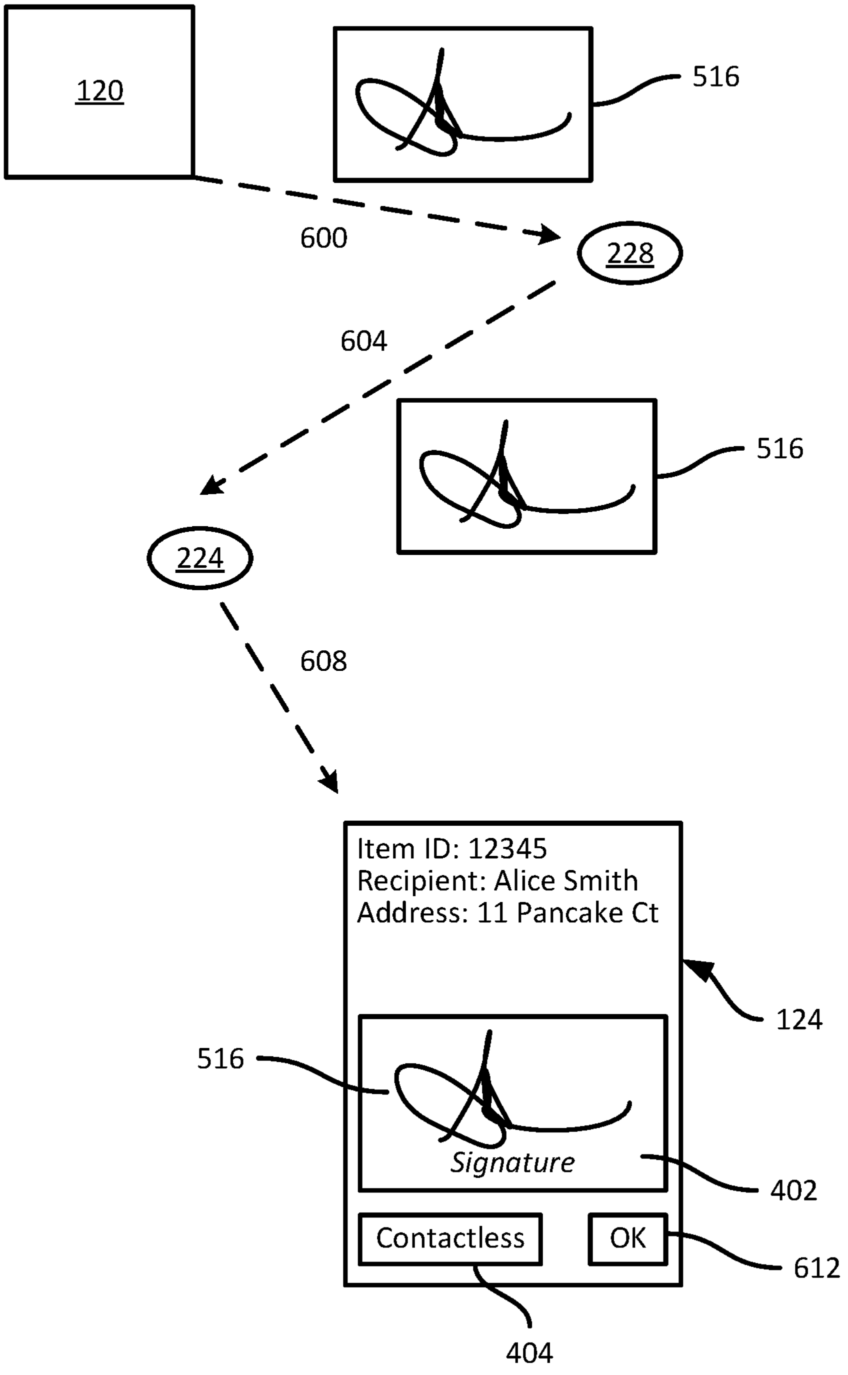
FIG. 6 is a diagram illustrating an example performance of blocks 350 and 355 of the method of FIG. 5.

At block 350, the server 120 can be configured to return the confirmation data to the driver device 124, which can receive and present the confirmation data at block 355. For example, turning to FIG. 6, the server 120 is shown transmitting the signature 516 to the device 124 (specifically, the application 228) at block 350, in a message 600. The application 228, in turn, returns the signature 516 to the application 224 via an internal message 604, and the application 224 then regains control of the display 262 via an operation 608. For example, the application 224 can update the interface shown in FIG. 4 to insert the signature 516 in the input element 402. The interface may also be updated, for example, with a button 612 to mark the delivery process as complete.

Variations to the above process are contemplated. For example, the machine-readable indicium 412 can include a message transmitted by the driver device 124, for delivery to the recipient device 128. The message can be an email message, a short message service (SMS) message, or the like. The driver device 124 may, for example, present a prompt to enter an email address and/or phone number corresponding to the recipient device 128. In other examples, the driver device 124 may obtain the email address and/or phone number from the server 120, when such information is stored at the server 120 in association with the item identifier obtained at block 305.

As will be apparent to those skilled in the art, the contactless collection of confirmation data may be applied to other use cases than the delivery of the item 104 to the residence 112 as shown above. For example, the driver device 124 may be operated by in-store staff at a retail facility implementing curb-side pickup, while the recipient device 128 may be operated by a customer making use of such curb-side pickup services. In a further example, the driver device 124 may be operated by staff at a facility such as a residential concierge desk, a postal office or other package depot, to which the recipient 108 may travel and employ the recipient device 128 to confirm that an item has been picked up therefrom.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a”, “has . . . a”, “includes . . . a”, “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially”, “essentially”, “approximately”, “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “coupled” as used herein is defined as connected, although not necessarily directly and not necessarily mechanically. A device or structure that is “configured” in a certain way is configured in at least that way, but may also be configured in ways that are not listed.

It will be appreciated that some embodiments may be comprised of one or more specialized processors (or “processing devices”) such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:

capturing, via a data capture module of a mobile computing device for use in delivery operations, an item identifier associated with an item for delivery to a recipient;

prior to generating a machine-readable indicium, and responsive to capturing the item identifier, controlling a display of the mobile computing device to present a delivery confirmation graphical user interface (GUI) including a signature field;

activating a contactless confirmation mode of the delivery confirmation GUI;

in the contactless confirmation mode, generating, via a processor of the mobile computing device, the machine-readable indicium encoding (i) a network identifier of a server, and (ii) the item identifier;

controlling an output device of the mobile computing device to present the machine- readable indicium for capture by a recipient data capture module of a recipient computing device and transmission of delivery confirmation data from a web browser application, via a recipient communications interface of the recipient computing device, to the server using the network identifier and the item identifier; and receiving an indication at the mobile computing device that the delivery confirmation data was received at the server from the recipient computing device.

2. The method of claim 1, wherein the capturing includes:

controlling the data capture module of the mobile computing device to scan an item indicium associated with the item; and decoding the item identifier from the item indicium.

3. The method of claim 1, wherein the machine-readable indicium further encodes a unique delivery identifier.

4. The method of claim 3, wherein the unique delivery identifier includes a timestamp corresponding to a time of generation of the machine-readable indicium and a device identifier of the mobile computing device.

5. The method of claim 1, wherein the machine-readable indicium is a graphical indicium, and wherein the output device includes a display.

6. The method of claim 1, wherein receiving the indication that the delivery confirmation data was received at the server includes:

receiving a signature captured at the recipient computing device, following a single scan operation at the recipient computing device to capture the machine-readable indicium, and transmitted from the recipient computing device to the server using the network identifier and the item identifier;

updating the delivery confirmation GUI interface to render the signature in the signature field.

7. The method of claim 1, wherein the delivery confirmation GUI interface further includes a selectable contactless signature element; and wherein the method further comprises, prior to generating the machine-readable indicium, receiving a selection of the contactless signature element.

8. The method of claim 1, further comprising:

storing, in the memory of the mobile computing device, a first application and a second application each executable by a controller;

executing the first application to capture the item identifier; and executing the second application to generate the machine-readable indicium and control the output device to present the machine-readable indicium.

9. The method of claim 8, further comprising receiving the indication that the delivery confirmation data was received at the server via execution of the second application; and via execution of the first application, obtaining the delivery confirmation data and presenting the delivery confirmation data.

10. A delivery computing device, comprising:

an output device;

a communications interface; and a processor configured to:

capture, via a data capture module in communication with the processor, an item identifier associated with an item for delivery to a recipient;

prior to generating a machine-readable indicium, and responsive to capturing the item identifier, control the output device to present a delivery confirmation graphical user interface (GUI) including a signature field;

activate a contactless confirmation mode of the delivery confirmation GUI;

in the contactless confirmation mode, generate, via the processor, the machine-readable indicium encoding (i) a network identifier of a server, and (ii) the captured item identifier;

control the output device to present the machine-readable indicium for capture by a recipient data capture module of a recipient computing device and transmission of delivery confirmation data from a web browser of the recipient computing device to the server using the network identifier and the item identifier; and receive from the server, via the communications interface, an indication that the delivery confirmation data was received at the server from the recipient computing device.

11. The delivery computing device of claim 10, wherein the processor is further configured to:

control the data capture module to scan an item indicium associated with the item; and decode the item identifier from the item indicium.

12. The delivery computing device of claim 10, wherein the machine-readable indicium further encodes a unique delivery identifier.

13. The delivery computing device of claim 12, wherein the unique delivery identifier includes a timestamp corresponding to a time of generation of the machine-readable indicium, and a device identifier of the delivery computing device.

14. The delivery computing device of claim 10, wherein the machine-readable indicium is a graphical indicium, and wherein the output device includes a display.

15. The delivery computing device of claim 10, wherein to receive the indication that the delivery confirmation data was received at the server, the processor is configured to:

receive a signature captured at the recipient computing device following a single scan operation at the recipient computing device to capture the machine-readable indicium, and transmitted from the recipient computing device to the server using the network identifier and the item identifier;

update the delivery confirmation GUI to render the signature in the signature field.

16. The delivery computing device of claim 10, wherein the delivery confirmation GUI further includes a selectable contactless signature element; and wherein the processor is further configured, prior to generating the machine-readable indicium, to receive a selection of the contactless signature element.

17. The delivery computing device of claim 10, wherein the processor is further configured to:

store, in a memory of the delivery computing device, a first application and a second application each executable by the controller;

execute the first application to capture the item identifier; and execute the second application to generate the machine-readable indicium and control an output device to present the machine-readable indicium.

18. The delivery computing device of claim 17, wherein the processor is further configured to:

receive the indication that the delivery confirmation data was received at the server via execution of the second application; and obtain the delivery confirmation data and present the delivery confirmation data via execution of the first application.

* * * * *